United States Patent
Gschwind

(10) Patent No.: US 9,021,512 B1
(45) Date of Patent: Apr. 28, 2015

(54) RUNTIME MANAGEMENT OF TOC POINTER SAVE AND RESTORE COMMANDS

(71) Applicant: International Business Machines Corporation, Armonk, NY (US)

(72) Inventor: Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/483,524

(22) Filed: Sep. 11, 2014

Related U.S. Application Data

(63) Continuation of application No. 14/211,255, filed on Mar. 14, 2014.

(51) Int. Cl.
*G06F 13/00* (2006.01)
*G06F 9/445* (2006.01)
*G06F 9/44* (2006.01)

(52) U.S. Cl.
CPC .............. *G06F 9/44505* (2013.01); *G06F 8/70* (2013.01)

(58) Field of Classification Search
CPC .................................................. G06F 9/44521
USPC ........................... 719/331, 332; 717/162, 163
See application file for complete search history.

(56) References Cited

U.S. PATENT DOCUMENTS

| | | | | |
|---|---|---|---|---|
| 5,845,118 | A * | 12/1998 | Gheith | 717/158 |
| 7,228,527 | B1 * | 6/2007 | Phillips et al. | 717/127 |
| 7,320,121 | B2 * | 1/2008 | Krueger | 717/106 |
| 2003/0217355 | A1 * | 11/2003 | Hack et al. | 717/129 |
| 2013/0086570 | A1 | 4/2013 | Blainey et al. | |
| 2013/0185705 | A1 * | 7/2013 | Kuesel et al. | 717/152 |

\* cited by examiner

*Primary Examiner* — Andy Ho
(74) *Attorney, Agent, or Firm* — Cantor Colburn LLP; Steven Bennett

(57) ABSTRACT

Embodiments relate to runtime management of table of contents (TOC) pointer save and restore commands. An aspect includes receiving, by a computer system, application object code comprising a first function call. Another aspect includes determining, at runtime of the application object code, that the first function call comprises an external function call from a calling function in the application object code to a callee function that is external to the application object code. Yet another aspect includes, based on determining that the first function call comprises the external function call, inserting a TOC save command and a TOC restore command corresponding to the first function call into the application object code.

14 Claims, 6 Drawing Sheets

RUNTIME MANAGEMENT OF TOC POINTER SAVE AND RESTORE COMMANDS

CROSS-REFERENCE TO RELATED APPLICATION

This application is a continuation of U.S. application Ser. No. 14/211,255 (Gschwind), filed on Mar. 14, 2014, which is herein incorporated by reference in its entirety.

BACKGROUND

The present invention relates generally to computer systems, and more specifically, to runtime management of table of contents (TOC) pointer save and restore commands.

In computer software, an application binary interface (ABI) describes the low-level interface between an application program and the operating system or between the application program and another application. The ABI cover details such as data type, size, and alignment; the calling conventions which controls how function arguments are passed and how return values are retrieved; the system call numbers and how an application should make system calls to the operating system; and in the case of a complete operating system ABI, the binary format of object files, program libraries and so on. Several ABIs (e.g., the Interactive Unix ABI allowing to a wide range of programs to run on a variety of Unix and Linux variants for the Intel x86 architecture) allow an application program from one operating system (OS) supporting that ABI to run without modifications on any other such system, provided that necessary shared library code are present, and similar prerequisites are fulfilled.

The program development cycle of a typical application program includes writing source code, compiling the source code into object files, building shared library code, and linking of the object files into a main executable program. Additional preparation, including loading of the main executable program, and loading of the shared library code for application start-up occurs before the application is executed on a particular hardware platform.

The compiler works on a single source file (compile unit) at a time to generate object files. The compiler generates object code without knowing the final address or displacement of the code/data. Specifically, the compiler generates object code that will access a TOC for variable values without knowing the final size of the TOC or offsets/addresses of various data sections. Placeholders for this information is left in the object code and updated by the linker A TOC is a variable address reference table that is utilized, for example in an AIX environment, to access program variables in a manner that supports shared library code and is data location independent. A similar structure, referred to as a global offset table (GOT), performs a similar function (e.g., indirect and dynamically relocatable access to variables) in a LINUX environment. One difference between a TOC and a GOT is that a TOC may contain actual data, where a GOT only contains addresses (pointers) to data. In the Linux PowerPC 64-bit environment the TOC contains the GOT section plus small data variables.

Each module in a computer program may have a different TOC pointer value. The TOC pointer register or GOT pointer register (referred to hereinafter as the TOC pointer register) is therefore saved and restored for each function call, either by the caller using one of inline code in the calling function and/or a procedure linkage table (PLT) stub code segment containing a TOC store, or by the callee function in conventions where the TOC pointer register is been treated as a preserved (i.e., callee-saved) register.

SUMMARY

Embodiments include a method and computer program product for runtime management of table of contents (TOC) pointer save and restore commands. An aspect includes receiving, by a computer system, application object code comprising a first function call. Another aspect includes determining, at runtime of the application object code, that the first function call comprises an external function call from a calling function in the application object code to a callee function that is external to the application object code module. Yet another aspect includes, based on determining that the first function call comprises the external function call, inserting a TOC save command and a TOC restore command corresponding to the first function call into the application object code.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
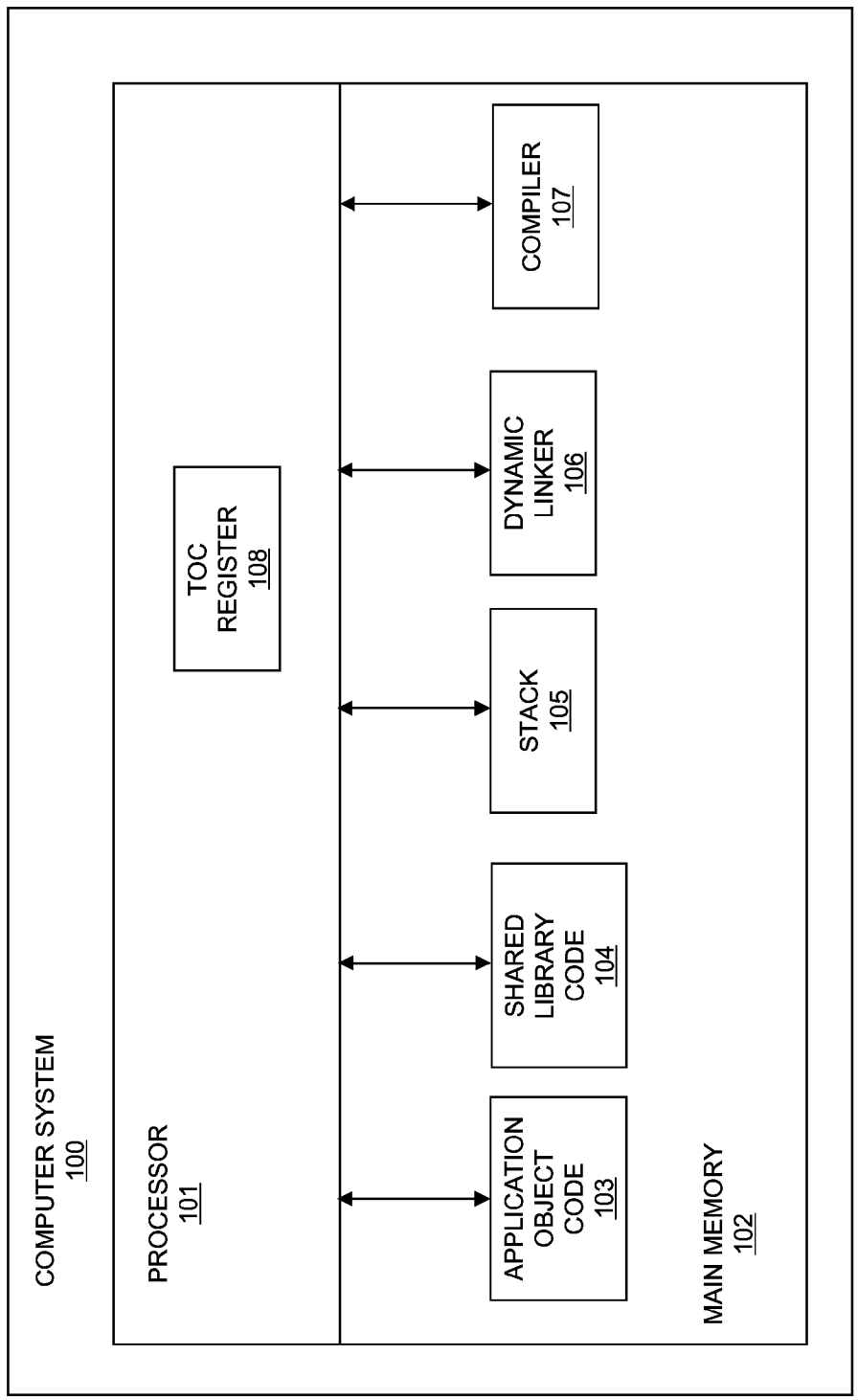
FIG. 1 depicts a computer system for runtime management of TOC pointer save and restore commands in accordance with an embodiment.

Embodiments of runtime management of TOC pointer save and restore commands are provided, with exemplary embodiments being discussed below in detail. For a function call from a calling function to a callee function that is external to the calling function (i.e., an external function call with the caller and callee functions in distinct object modules), the TOC pointer value is different for the calling and the callee function, and the TOC register needs to be saved and restored in conjunction with the external function call. However, for a function call from a calling function to a callee function that is local to the calling function (i.e., a local function call where the caller and callee are in the same module), the TOC pointer value is the same for the calling and the callee function, and the TOC register does not need to be saved and restored in conjunction with the local function call. Therefore, TOC pointer save and restore commands may be inserted into compiled code at runtime as required for external function calls, after it is resolved, for each function call in the compiled code, whether the function call is a local function call or an external function call. For local function calls, no TOC pointer save and restore commands are inserted, avoiding unnecessary operations regarding the TOC pointer. The external function may be part of, for example, a shared library that is used by the program that contains the calling function, or a separate software module in the computer system that is distinct from the main application object code module that contains the calling function.

In some embodiments, a dynamic linker may perform the resolution of whether function calls are local or external at runtime, and insert TOC save and restore commands into the compiled code as necessary. In accordance with one embodiment, the linker directly modifies executable code. In another embodiment, the linker works in conjunction with a dynamic code optimizer. In further embodiments, a compiler may insert placeholder instructions comprising no-operation (NOP) instructions adjacent to each function call (both local and external) in the program at the time of generation of the compiled code. The placeholder instructions indicate the locations of TOC save and restore points, and act as placeholders for TOC save and restore commands. For local function calls, the placeholder instructions are left in place by the dynamic linker; for external function calls, the placeholder instructions are replaced by TOC save and restore commands. A TOC save command may comprise a command to save a current TOC pointer value from a TOC register to a TOC save area in a stack entry corresponding to the calling function before an external function call, and a TOC restore point may comprise loading the saved TOC pointer value from the TOC save area to the TOC register after the external function completes and execution returns to the calling function. In one embodiment, the TOC save and/or restore points are not adjacent to the call instruction, but are scheduled so as to optimize performance of execution of the application object code. In at least one such embodiment, relocation types are used to associate each save and restore point with a corresponding function call. In at least one embodiment, multiple call sites may be associated with a common TOC save point, or in another embodiment, with a common TOC restore point.

In further embodiments, the placeholder instruction may be any other appropriate type of instruction, for example, a TOC save or restore instruction. In one such embodiment, a placeholder instruction may correspond to an already existing TOC save and/or restore command, respectively, that has already been inserted by the compiler on behalf of another call site (e.g., a register-indirect function pointer call). In further embodiments in which no placeholder instruction is allocated by a compiler, the TOC save command and/or restore command may be inserted in a PLT code stub comprising multiple commands that are generated by the dynamic linker.

In some embodiments, the dynamic linker may use an eager binding scheme, in which resolution of whether function calls are local or external is performed for all of the function calls when a module is loaded, and TOC save and restore commands are inserted into the compiled code for external function calls, before the compiled code is run. In other embodiments, the dynamic linker may use a lazy binding scheme, in which whether a function call is local or external is resolved when the function call is encountered during running of the compiled code, and TOC save and restore commands are inserted for each external function calls after resolution that the function call is an external function call. Therefore, in some embodiments of a dynamic linker that implements a lazy binding scheme, the dynamic linker explicitly calculates and stores the TOC pointer value of the calling function to the TOC save area in the stack frame corresponding to the calling function after resolution that a function call is an external function call because the TOC save point has been passed at a point where the dynamic linker performs resolution, missing the first TOC save corresponding to the first TOC save point prior to the invocation of the dynamic linker in a lazy binding scheme. In one embodiment, the dynamic linker also updates additional TOC save and restore commands corresponding to a resolved function sharing a PLT entry, and, in at least some embodiments, stores computed TOC values in additional active calling frames for calling functions where a TOC save point has already been passed for an impending call to the function being resolved.

In further embodiments corresponding to a dynamic linker that implements lazy binding in a multithreaded environment, a first thread may execute a path that includes an unresolved function call and proceed past a TOC store point comprising a placeholder instruction, and reach an external function call without having performed the TOC save when a second thread resolves that the unresolved function call is an external function call. In some embodiments, the dynamic linker inspects the current state of the second thread, and uses unwind information (e.g., in the DWARF format) to analyze the call stack of the second thread to determine whether any active functions in the stack are in a path that includes the external function call, but have called another function and have not yet reached the external function call, and the TOC pointer values for the calling function in the second thread are explicitly calculated and stored by the dynamic linker.

FIG. 1 illustrates an embodiment of a computer system 100 for runtime management of TOC save and restore commands. Computer system 100 comprises a processor 101 and a main memory 102. Application object code 103, which is generated from program source code (not shown) by a compiler such as compiler 107, comprises a plurality of functions, and is stored in main memory 102 for execution by processor 101. The application object code 103 may be generated by a compiler that is located on a different computer system from computer system 100. Shared library code 104 comprise functions that are external to application object code 103 and that may be called during execution of application object code 103 via external function calls (i.e., calls to functions in other modules). Stack 105 comprises a data structure that stores information, including a TOC pointer, related to active functions during the execution of application object code 103. Each active function in application object code 103 has a respective stack frame in stack 105 during execution. Dynamic linker 106 comprises a runtime component that implements runtime management of TOC save and restore commands in application object code 103. TOC register is located in processor 101. TOC register 108 stores a current value of a TOC pointer for the currently active function of application object code 103 or shared library code 104 (i.e., the function that is currently executing). The TOC register 108 may be general purpose register R2 in some embodiments. In further embodiments of a computer system such as computer system 100, the TOC register 108 may store a GOT value instead of a TOC pointer value, and GOT save and restore commands may be managed in application object code 103 and/or shared library code 104 by dynamic linker 106. In some embodiments, the computer system 100 may further comprise another object code module that is distinct from the application object code 103 and the shared library code 104, and the other object code module may also contain functions that are called by application object code 103 via external function calls.

Figure 2:
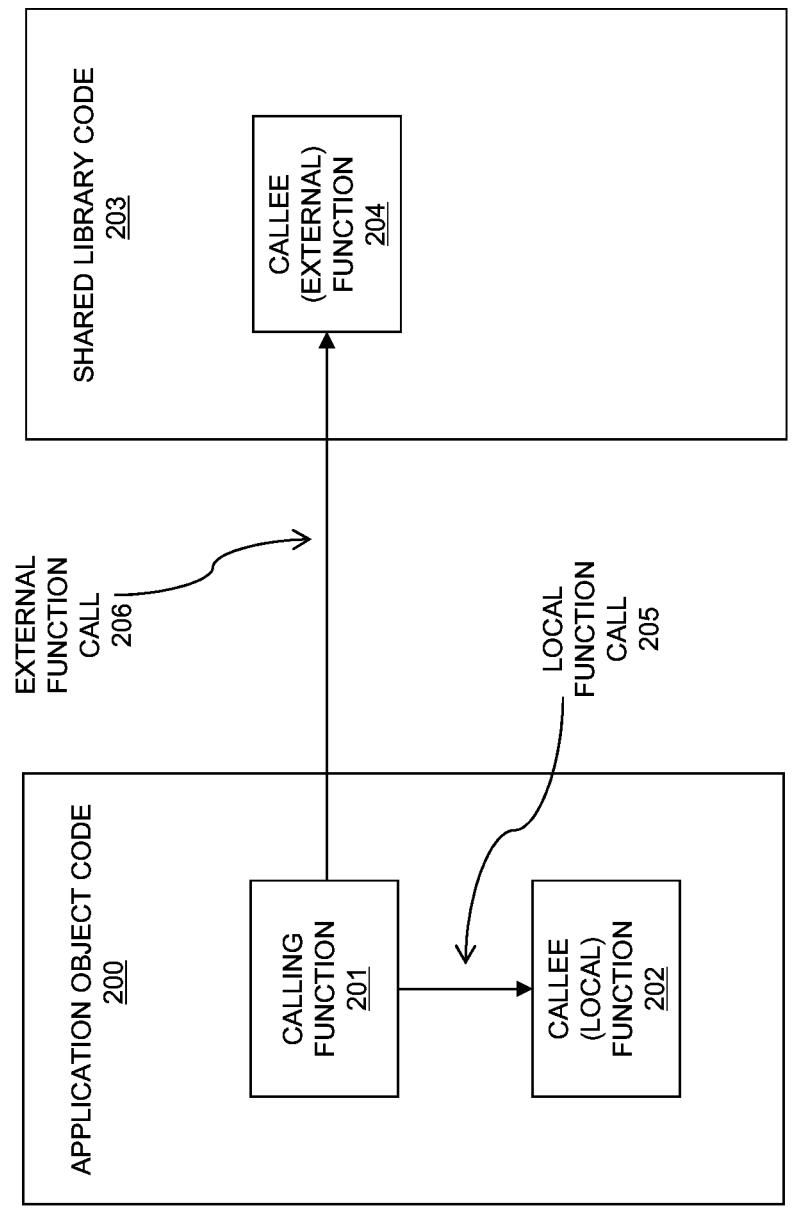
FIG. 2 depicts local and external function calls accordance with an embodiment.

FIG. 2 illustrates an embodiment of a local function call 205 and an external function call 206. Application object code 200 may comprise application object code 103 of FIG. 1, and shared library 203 may comprise shared library code 104 of FIG. 1. Calling function 201 and callee function 202 are part of application object code 200, and callee function 204 is part of shared library 203. If the calling function 201 and the callee function 202 are both part of application object code 200, the callee function 202 is local to the calling function 201 and the call is a local function call 205, and the calling function 201 and the callee function 202 have the same TOC pointer value, so the TOC pointer value does not need to be save and restored in conjunction with the local function call 205. If the calling function 201 is part of the application object code 200, and the callee function 204 is in the shared library 203, then the callee function 204 is external to the calling function 201 and the call is an external function call 206, and the calling function 201 and the callee function 204 have different TOC pointer values. When calling function 201 performs an external function call to callee function 204, when execution passes from the calling function 201 to the callee function 204, the value of the TOC pointer of the calling function 201 is saved from TOC register 108 to the stack frame for the calling function 201 in the stack 105, and the TOC pointer value of callee function 204 is stored in TOC register 108. When the callee function 204 exits and execution passes back to the calling function 201, the value of the TOC pointer of the calling function 201 is restored to the TOC register 108 from the stack frame for the calling function 201 in the stack 105. FIG. 2 is shown for illustrative purposes only; any number of functions may be included in application object code 200 and shared library 203, and these functions may call one another in any appropriate manner. In some embodiments, the computer system 100 may further comprise another object code module that is distinct from the application object code 103/200 and the shared library code 104/203, and the other object code module may also contain functions that are called by application object code 103/200 via external function calls such as external function call 206.

Figure 3:
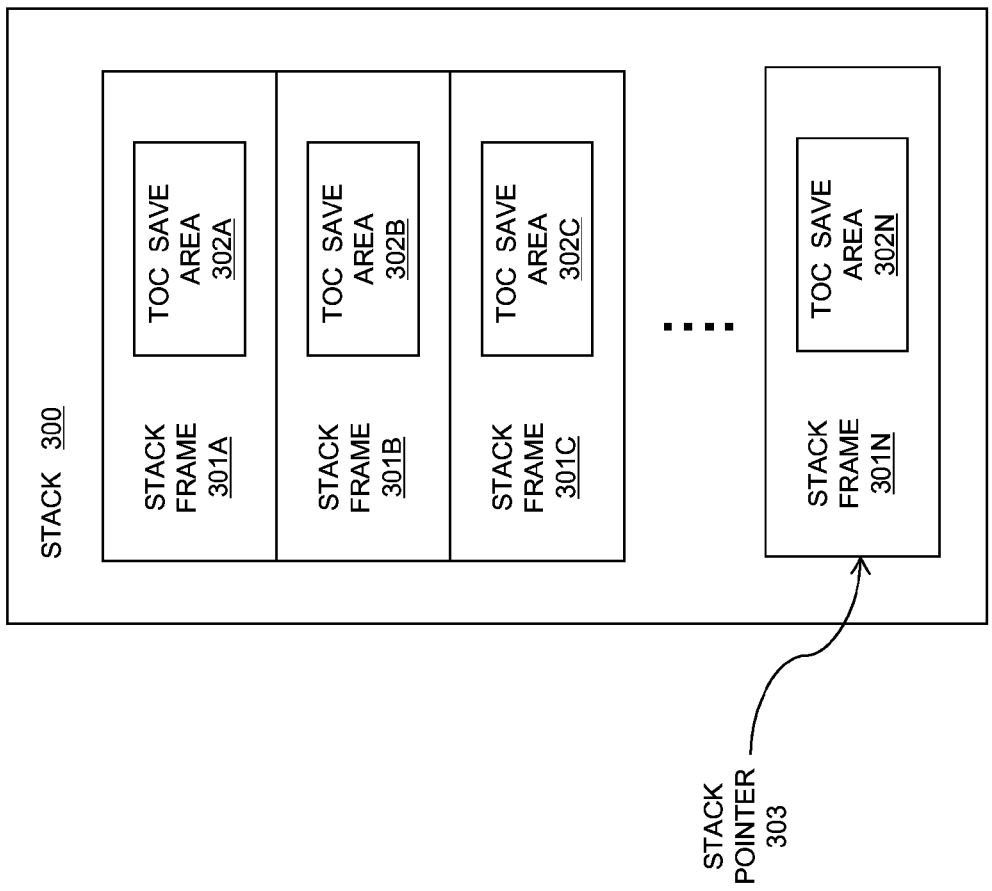
FIG. 3 depicts a stack for runtime management of TOC pointer save and restore commands in accordance with an embodiment.

FIG. 3 illustrates an embodiment of a runtime stack 300. Stack 300 may comprise stack 105 of FIG. 1. Stack 300 includes a plurality of stack frames 301A-N corresponding to active functions that are currently being executed during execution of application object code 103 by processor 101. The stack 300 grows downwards from stack frame 301A, and a stack pointer 303 points to the most recently added stack frame 301N on the stack 300. Each stack frame of stack frames 301A-N stores information regarding its respective function, and includes a respective TOC save area 302A-N. When a calling function 201 calls an external callee function 204, the TOC pointer value of the calling function 201 is saved from the TOC register 108 to the TOC save area of the calling function's stack frame (for example, TOC save area 302N in stack frame 301N) in stack 300 for restoration to the TOC register 108 after the callee function 204 completes and execution passes back to the calling function 201.

Figure 4:
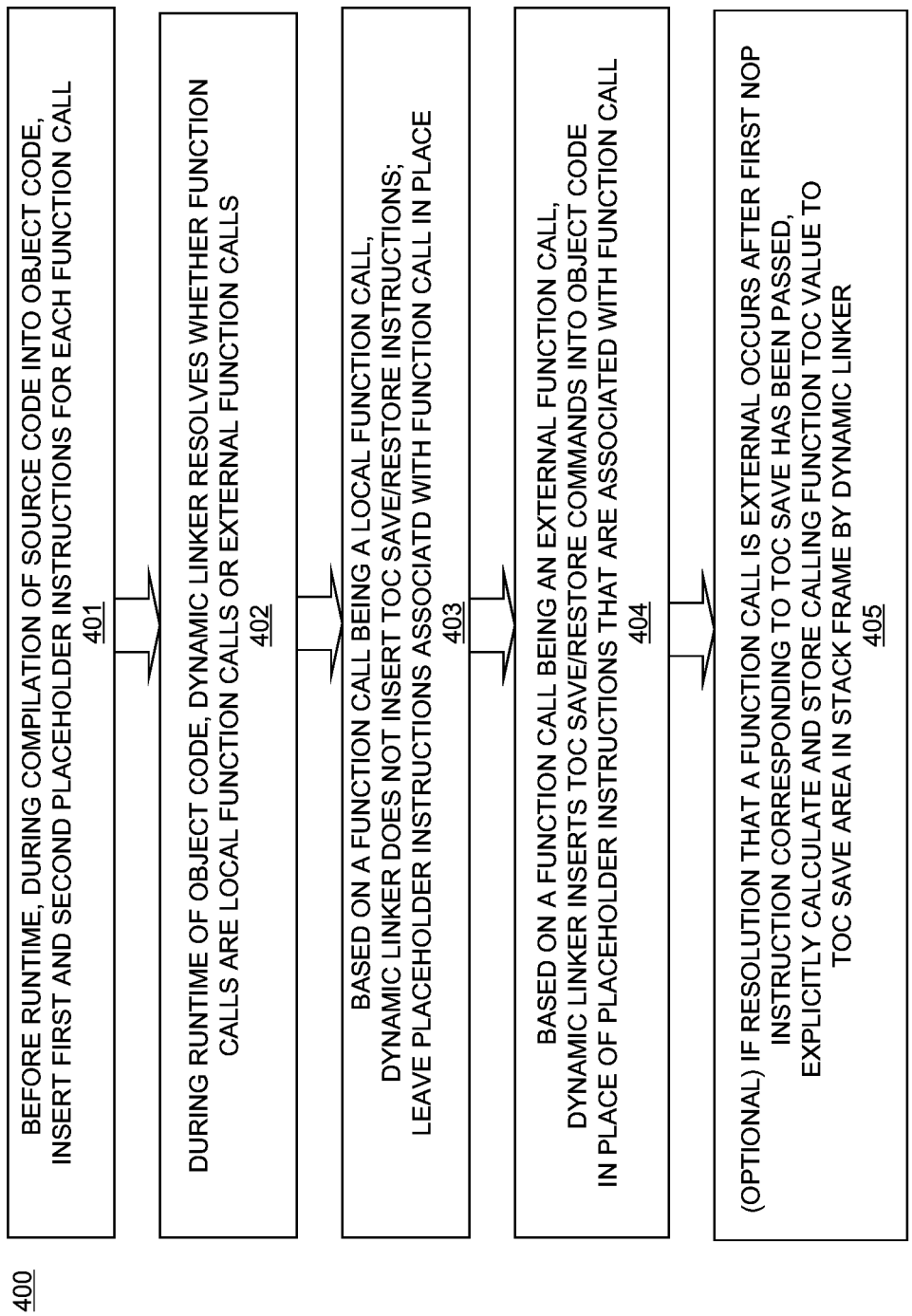
FIG. 4 depicts a process flow for runtime management of TOC pointer save and restore commands in accordance with an embodiment.

FIG. 4 illustrates an embodiment of a method 400 for runtime management of TOC pointer save and restore commands. FIG. 4 is discussed with respect to FIGS. 1-3. First, in block 401, before runtime, a compiler, such as compiler 107, generates application object code 103 (and, in some embodiments, shared library code 104) from program source code (not shown). The compiler that generates application object code 103 (and, in some embodiments, shared library code 104) may be located on another computer system that is distinct from computer system 100. In some embodiments, another compiler on a third distinct computer may generate shared library code 104). The compiler inserts placeholder instructions, which may comprise NOP instructions, at the TOC save and restore points corresponding to function calls in the application object code 103 during compiling. The placeholder instructions act as placeholders for TOC save and restore commands. In further embodiments, placeholder instructions corresponding to TOC save and restore points may be inserted manually by a programmer into program source code that comprises assembly code. Two placeholder instructions may be inserted adjacent to each function call (both external and local) in the application object code 103. In some embodiments, there may be a first placeholder instruction inserted before each function call in a calling function corresponding to a TOC save point, and a second placeholder instruction inserted after each function call in s calling function corresponding to a TOC restore point. In other embodiments, a compiler may schedule TOC save and restore points and indicate the location of such points using relocation information for a call site. In at least one embodiment, at least one TOC save point is shared between two call sites, i.e., only a single TOC save site is indicated and only a single TOC save performed, when at least one of the two call sites call an external function. In other embodiments, the placeholder instructions corresponding to TOC save and restore points may be inserted at the beginning and the end of a callee function. Table 1 illustrates an example of pseudocode corresponding to the application object code after block 401, after insertion of placeholder instructions comprising NOP instructions.

TABLE 1

| Pseudocode with inserted placeholder instructions | |
|---|---|
| f( ) | //calling function |
| { | |
| NOP | //first NOP (TOC save point) for call to d( ) |
| d( ) | //call to local function |
| NOP | //second NOP (TOC restore point) for call to d( ) |
| NOP | //first NOP (TOC save point) for call to g( ) |
| g( ) | //call to external function |
| NOP | //second NOP (TOC restore point) for call to g( ) |
| } | |

Next, in block 402, during execution of application source code 103/200 by the processor 101, the dynamic linker 106 resolves whether the function calls are local function calls such as local function call 205 or external function calls such as external function call 206. In some embodiments, the dynamic linker 106 may perform the resolving of all function calls in application object code 103 before starting execution of the application object code 103/200 (i.e., eager binding); in other embodiments, the dynamic linker 106 may perform the resolving as the function calls are encountered during execution of the application object code 103/200 (i.e., lazy binding).

In block 403, based on determining that a function call is a local function call 205, the dynamic linker 106 does not insert any TOC save and restore commands for the local function call 205, but rather leaves the placeholder instructions corresponding to the function call in place, as the calling function 201 and the callee function 202 have the same TOC pointer value. In block 404, based on determining that a function call is an external function call 206, the dynamic linker 106 replaces the first placeholder instruction associated with the external function call 206 with an instruction that stores the TOC pointer value of the calling function 201 from the TOC register 108 to the TOC save area in the stack frame of the calling function 201 in stack 105 (for example, TOC save area 302N in stack frame 301N in FIG. 3), and replaces the second placeholder instruction (or other placeholder instruction)

associated with the external function call 206 with an instruction that restores the saved TOC pointer value from the TOC save area in the stack frame of the calling function 201 in stack 105 to the TOC register 108. In one embodiment, when no placeholder instructions (such as NOP instructions) are associated with a call site to an external function, the dynamic linker may generate a PLT stub code that contains TOC save and/or TOC restore instructions, or use a trampoline (i.e., an inserted code sequence) in conjunction with a PLT stub that contains at least one of a TOC save and/or restore instruction. In an embodiment of method 400 that comprises eager binding, one of blocks 403 and 404 is performed for each of the function calls in application object code 103/200 by the dynamic linker 106 at runtime but before starting execution of the application object code 103/200. In an embodiment of method 400 that comprises lazy binding, one of blocks 403 and 404 is performed by dynamic linker 106 for each unresolved function call that is encountered during execution of application object code 103/200 at the time when the function call is encountered. Table 2 illustrates an example of pseudocode corresponding to the application object code after completion of blocks 403/404.

TABLE 2

Pseudocode with replaced placeholder instructions

| | |
|---|---|
| f( ) | //calling function |
| { | |
| NOP | //first NOP (TOC save point) for call to d( ) |
| d( ) | //call to local function |
| NOP<br>save TOC for d( ) | //second NOP (TOC restore point) for call to d( ) |
| g( )<br>restore TOC for d( ) | //call to external function |
| } | |

In block 405, in an embodiment in which the dynamic linker 106 implements lazy binding as described above with respect to blocks 402-404, if resolution that a function call is an external function call 206 occurs after the point where the first placeholder instruction corresponding to the external function call is located (i.e., the placeholder instruction corresponding to the TOC save), the dynamic linker 106 explicitly calculates and stores the TOC pointer value of the calling function 201 to the TOC save area in the stack frame of the calling function 201 in stack 105 (for example, TOC save area 302N in stack frame 301N in FIG. 3) based on the resolution that the function call is an external function call. For example, in the pseudocode of Table 1, when the dynamic linker 106 resolves that function go is an external function upon the first invocation of g( ) whereupon the dynamic linker is called to perform binding (resolution) of the function to determine the location of the function go, the TOC save point for function call go has already been passed without saving the TOC pointer value of function f( ). Therefore, in this example, the dynamic linker 106 would explicitly calculate and save the TOC pointer value for function f( ) to the TOC save area in the stack frame of function f( ) after resolving that the call to function go is an external function call.

If multiple calling functions are active that include a call to an external function that is resolved after the associated TOC save point has been passed, then the dynamic linker explicitly calculates and stores the TOC pointer value of each of the calling functions 201 in their respective TOC save areas 301A-N in stack frames 301A-N. For example, in the example pseudocode shown below in Table 3, the call to function c( ) is resolved in response to the call to c( ) from function b( ) for both functions a( ) and b( ) and a determination is made that c( ) corresponds to an external function. However, the TOC save point has been passed for the external call to c( ) in both functions a( ) and b( ). The functions a( ) and b( ) may correspond to stack frames 302A and 302B, respectively. The dynamic linker 106 may then compute the TOC pointer corresponding to both functions a( ) and b( ) and store the computed TOC pointer in the respective TOC save areas 302A and 302B of stack frames 301A and 301B.

TABLE 3

Pseudocode with inserted placeholder instructions for TOC save/restore points and multiple TOC save points for g( ) which may have been concurrently passed

| | |
|---|---|
| a( ) | //calling function |
| { | |
| NOP | //first NOP (TOC save point) for call to b( ) and c( ) |
| b( ) | //call to local function |
| NOP | //second NOP (TOC restore point) for call to a( ) |
| c( ) | //call to external function |
| NOP | //second NOP (TOC restore point) for call to c( ) |
| } | |
| b( ) | |
| { | |
| NOP | //first NOP (TOC save point) for call to c( ) |
| c( ) | //call to external function |
| NOP | //second NOP (TOC restore point) for call to c( ) |
| } | |

In at least one embodiment, DWARF unwind information is used to determine for each active stack frame whether the call point to the next subroutine corresponds to a position between a first TOC save point and a pending external call to a function having been resolved by a dynamic linker as being external. In some embodiments, an eager binding scheme is used by the dynamic linker 106 to avoid the complexity of updating stack frames with TOC pointer values.

Figure 5:
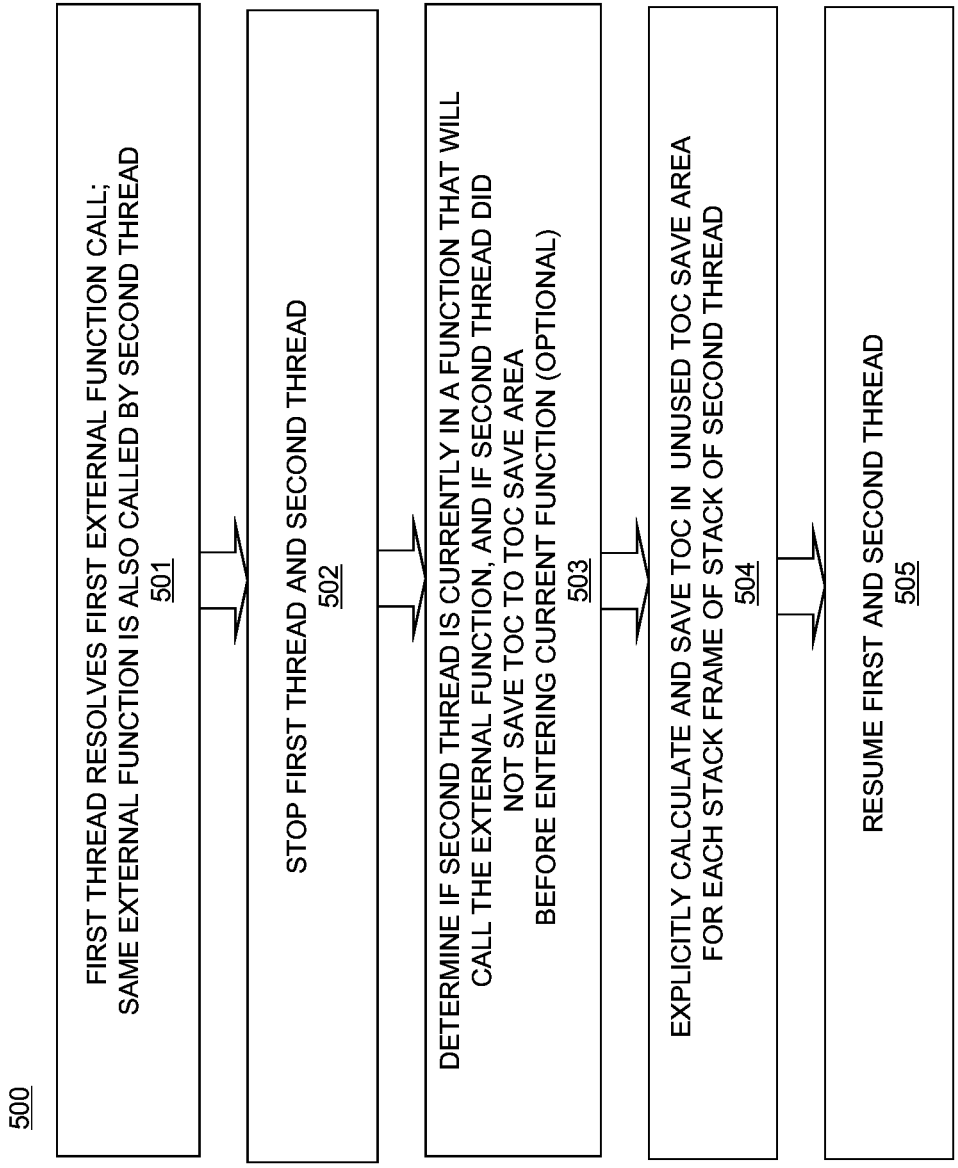
FIG. 5 depicts a process flow for runtime management of TOC pointer save and restore commands in a multithreaded computer system in accordance with an embodiment.

FIG. 5 illustrates an embodiment of a method 500 for runtime management of TOC pointer save and restore commands in a multithreaded computer system that also implements lazy binding as is discussed above with respect to FIG. 4. First, in block 501, a first thread in the computer system resolves that a function call from a calling function 201 to a callee function 204 is an external function call 206. It is also determined that the callee function 204 is also called via an external function call by a second thread in the multithreaded computer system. Next, in block 502, the first thread and the second thread are stopped. In block 503, it is determined if the second thread is currently in a calling function 201 that will call the callee function 204 via an external function call, and if the second thread did not save the TOC pointer value to the TOC save area for the calling function before entering the current function. Block 503 is optional in some embodiments. Then, in block 504, the dynamic linker 106, starting with the current, active function of the second thread (i.e., the function associated with stack frame 301N that is currently pointed to by stack pointer 303), and then successively for each parent function of the current function, explicitly calculates and saves the TOC pointer values of each of the functions in the unused TOC save areas 302A-N of each stack frame 301A-N in the stack 300 of the second thread until the end of the stack 300 is reached (i.e., the function that is associated with stack frame 301A). In some embodiments, block 504 is only performed if the determination of block 503 is that the second thread is currently in a calling function 201 that will call the callee function 204 via an external function call, and the second thread did not save the TOC pointer value to the TOC save area for the current function before entering the current function; in other embodiments, block 503 is skipped and block 504 is performed for any resolution of an external function call in block 501. Lastly, in block 505, the first and second threads resume execution.

Technical effects and benefits include avoiding performing a save and restore of the TOC register for local function calls.

Figure 6:
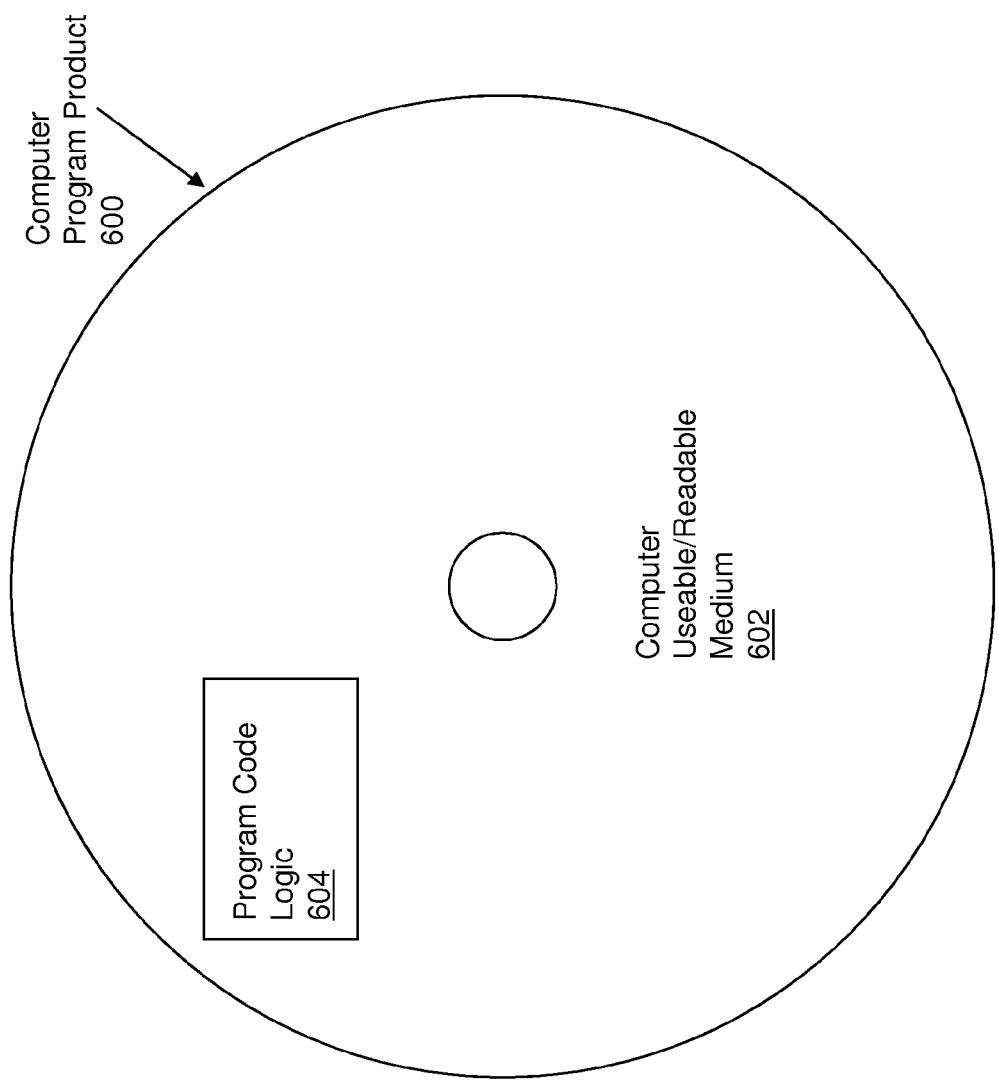
FIG. 6 illustrates a computer program product in accordance with an embodiment.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for runtime management of table of contents (TOC) pointer save and restore commands, the method comprising:
   receiving, by a computer system, application object code comprising a first function call;
   determining, at runtime of the application object code, that the first function call comprises an external function call from a calling function in the application object code to a callee function that is external to the application object code; and
   based on determining that the first function call comprises the external function call, inserting a TOC save command and a TOC restore command corresponding to the first function call into the application object code.

2. The method of claim 1, wherein the TOC save command comprises a command to save a TOC pointer value of the calling function from a TOC register of the computer system to a TOC save area in a stack frame corresponding to the calling function in a runtime stack of the computer system before execution of the callee function, and wherein the TOC restore command comprises a command to restore the TOC pointer value of the calling function from the TOC save area to the TOC register after completion of execution of the callee function.

3. The method of claim 1, wherein the received application object code comprises a first placeholder instruction corresponding to a first TOC save point and a second placeholder instruction corresponding to a first TOC restore point, wherein the first and second placeholder instructions are associated with the first function call, wherein the TOC save command is inserted in place of the first placeholder instruction, and wherein the TOC restore command is inserted in place of the second placeholder instruction.

4. The method of claim 3, wherein the first and second placeholder instructions comprise no-operation (NOP) instructions that were inserted into the application object code by a compiler that generated the application object code.

5. The method of claim 3, wherein the computer system implements a lazy binding scheme, and further comprising:
   based on determining that the first function call comprises the external function call, determining whether execution of the application object code has proceeded past the first placeholder instruction; and
   based on determining that execution of the application object code has proceeded past the first placeholder instruction, calculating the TOC pointer value of the calling function; and
   storing the calculated TOC pointer value of the calling function in a TOC save area in a stack frame corresponding to the calling function in a runtime stack of the computer system.

6. The method of claim 3, wherein the computer system comprises a multithreaded computer system that implements a lazy binding scheme, wherein it is determined by a first thread of the computer system that the first function call is the external function call, and further comprising:
   stopping the first thread and a second thread of the computer system;
   determining whether an active function of the second thread comprises a call to the callee function;
   based on determining that the active function of the second thread comprises a call to the callee function, determining whether a TOC pointer value of the active function was saved;
   based on determining that the TOC pointer value of the active function was not saved, calculating the TOC pointer value of the active function;
   saving the calculated TOC pointer value of the active function in a TOC save area in a stack frame corresponding to the active function in a runtime stack of the computer system; and
   for any parent function of the active function, calculating the TOC pointer value of the parent function and saving the calculated TOC pointer value of the parent function in a TOC save area in a stack frame corresponding to the parent function in the runtime stack of the computer system.

7. The method of claim 1, wherein the callee function is part of a shared library.

8. The method of claim 1, wherein the application object code further comprises a second function call, a third placeholder instruction corresponding to a second TOC save point, and a fourth placeholder instruction corresponding to a second TOC restore point, wherein the third and fourth placeholder instructions are associated with the first function call, and further comprising:
   determining, at runtime of the application object code, that the second function call comprises a local function call from a calling function of the application object code to a callee function that is internal to the application object code;
   based on determining that the second function call comprises the local function call, leaving the third placeholder instruction and the fourth placeholder instruction in place in the application object code.

9. A computer program product for implementing runtime management of table of contents (TOC) pointer save and restore commands, the computer program product comprising:
 a computer readable storage medium having program instructions embodied therewith, the program instructions readable by a processing circuit to cause the processing circuit to perform a method comprising:
 receiving application object code comprising a first function call;
 determining, at runtime of the application object code, that the first function call comprises an external function call from a calling function in the application object code to a callee function that is external to the application object code; and
 based on determining that the first function call comprises the external function call, inserting a TOC save command and a TOC restore command corresponding to the first function call into the application object code.

10. The computer program product of claim 9, wherein the TOC save command comprises a command to save a TOC pointer value of the calling function from a TOC register of the computer system to a TOC save area in a stack frame corresponding to the calling function in a runtime stack before execution of the callee function, and wherein the TOC restore command comprises a command to restore the TOC pointer value of the calling function from the TOC save area to the TOC register after completion of execution of the callee function.

11. The computer program product of claim 9, wherein the received application object code comprises a first placeholder instruction corresponding to a first TOC save point and a second placeholder instruction corresponding to a first TOC restore point, wherein the first and second placeholder instructions are associated with the first function call, wherein the TOC save command is inserted in place of the first placeholder instruction, and wherein the TOC restore command is inserted in place of the second placeholder instruction.

12. The computer program product of claim 11, wherein the first and second placeholder instructions comprise no-operation (NOP) instructions that were inserted into the application object code by a compiler that generated the application object code.

13. The computer program product of claim 9, wherein the callee function is part of a shared library.

14. The computer program product of claim 9, wherein the application object code further comprises a second function call, a third placeholder instruction corresponding to a second TOC save point, and a fourth placeholder instruction corresponding to a second TOC restore point, wherein the third and fourth placeholder instructions are associated with the first function call, and further comprising:
 determining, at runtime of the application object code, that the second function call comprises a local function call from a calling function of the application object code to a callee function that is internal to the application object code;
 based on determining that the second function call comprises the local function call, leaving the third placeholder instruction and the fourth placeholder instruction in place in the application object code.

* * * * *